United States Patent
Yewen

(10) Patent No.: US 6,813,324 B1
(45) Date of Patent: Nov. 2, 2004

(54) SYNCHRONIZED COMMUNICATION SYSTEM

(75) Inventor: Robert G. Yewen, Thornhill (CA)

(73) Assignee: Mine Radio Systems Inc., Stouffville (CA)

( * ) Notice: Subject to any disclaimer, the term of this patent is extended or adjusted under 35 U.S.C. 154(b) by 0 days.

(21) Appl. No.: 09/369,172

(22) Filed: Aug. 5, 1999

(51) Int. Cl.[7] .............................. H04B 1/40; H04B 7/00
(52) U.S. Cl. ....................... 375/354; 375/219; 375/335; 375/218; 370/332; 342/22
(58) Field of Search ................................ 342/22; 375/7, 375/37, 107, 31, 354, 240.18, 211, 218, 343, 219, 272; 370/95, 100, 110.1; 708/404; 381/71.8

(56) References Cited

U.S. PATENT DOCUMENTS

| | | | |
|---|---|---|---|
| 2,499,195 A | | 2/1950 | McNiven |
| 4,090,135 A | | 5/1978 | Farstad et al. |
| 4,208,630 A | * | 6/1980 | Martinez ..................... 340/7.1 |
| 4,223,185 A | * | 9/1980 | Picou .......................... 708/404 |
| 4,414,661 A | * | 11/1983 | Karlstrom ................... 370/332 |
| 4,777,652 A | * | 10/1988 | Stolarczyk ................. 455/3.03 |
| 5,325,095 A | * | 6/1994 | Vadnais et al. ............... 342/22 |
| 5,347,586 A | * | 9/1994 | Hill et al. ................... 381/71.8 |

FOREIGN PATENT DOCUMENTS

| | | | | |
|---|---|---|---|---|
| CA | WO 972645 | * | 7/1977 | ............ H01Q/7/00 |
| CA | 2168138 | | 7/1997 | |

* cited by examiner

*Primary Examiner*—Chieh M. Fan
*Assistant Examiner*—Edith Chang

(57) ABSTRACT

A synchronized communication system for communicating signals into and from a medium is disclosed. The communication system utilizes a transmitter located at a central station external to the medium, which transmits a low frequency synchronization signal into the medium. Transceivers located within the medium receive the low frequency synchronization signal and send information radio signals synchronized with the low frequency synchronization signal to a receiver located at the central station. Zone transceivers are located within the medium to receive and retransmit the synchronization signal at the low frequency within a zone. The zone transceivers also receive information signals from transceivers in the zone and transmit zone information radio signals to the central station containing information corresponding to the information received from the transceivers in the zone. The communication system also comprises repeater stations which act to retransmit both synchronization signals and information signals thereby increasing the propagation of the synchronous signals within the medium.

18 Claims, 5 Drawing Sheets

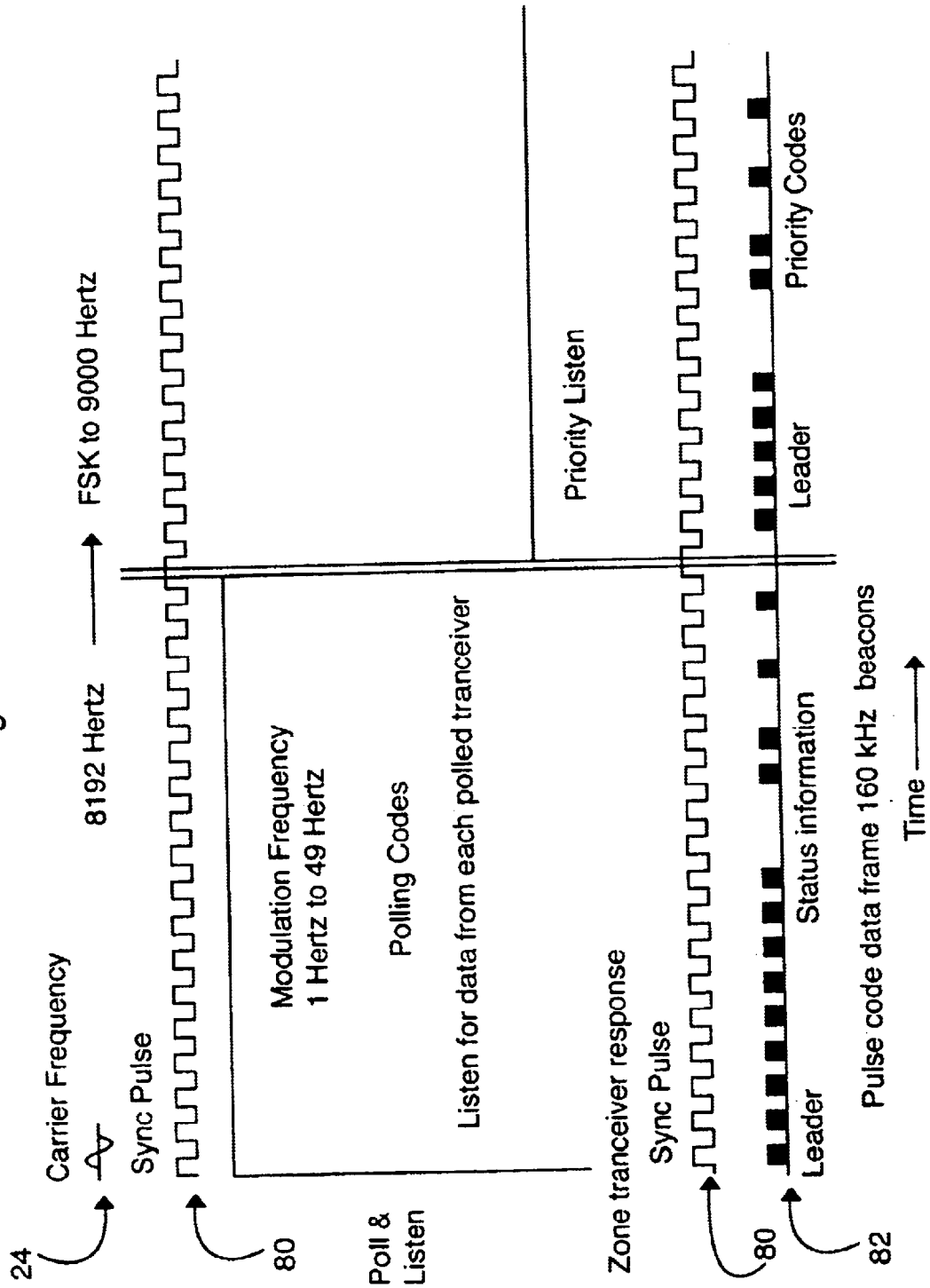

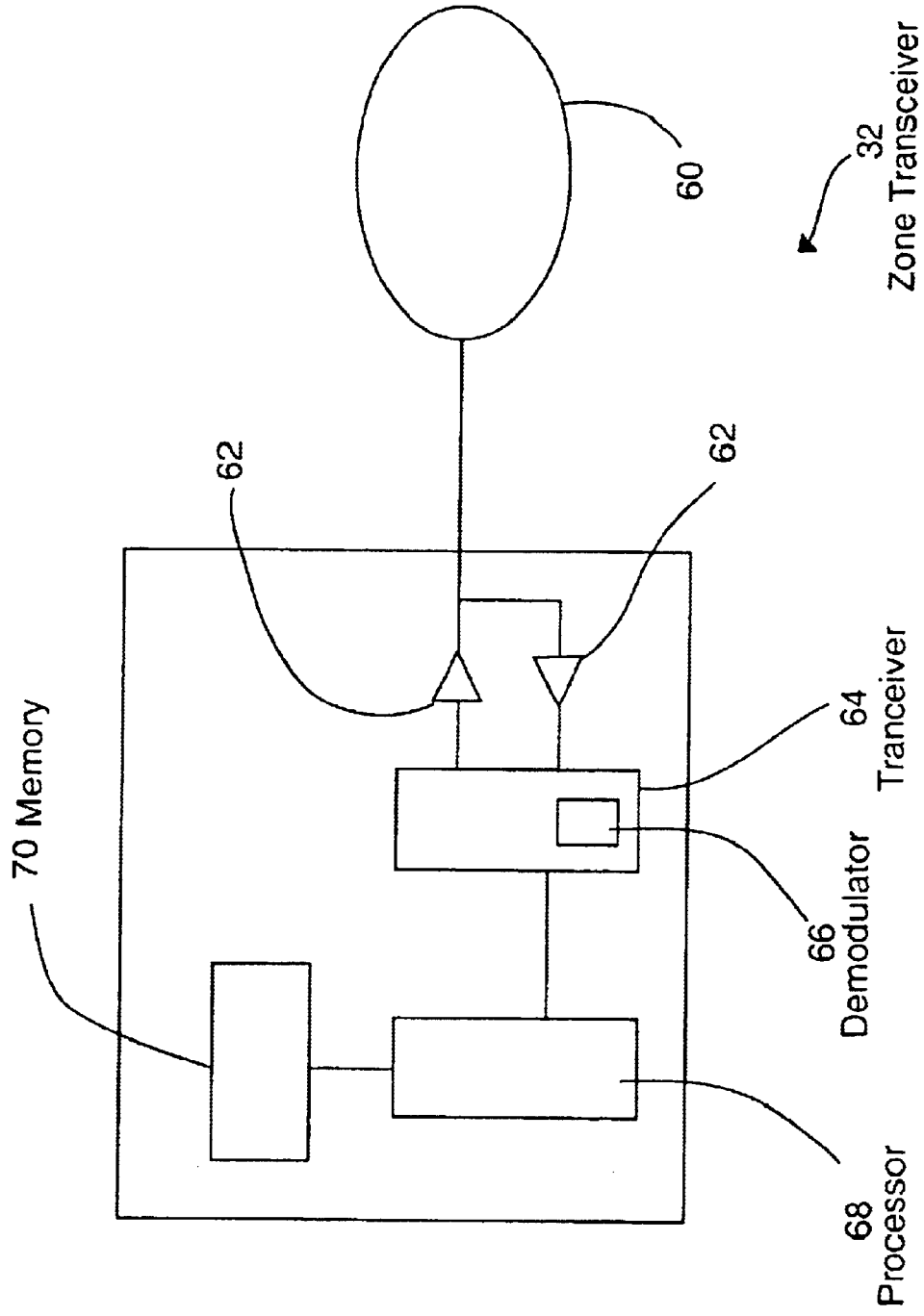

SYNCHRONIZED COMMUNICATION SYSTEM

FIELD OF THE INVENTION

This invention relates to radio frequency communication systems for communication of signals into a media. More specifically, the present invention relates to a synchronized communication system for communication of radio signals into an underground environment.

BACKGROUND OF THE INVENTION

Electromagnetic waves with a radio frequency have been used in the past to transmit information between remote locations. Such electromagnetic waves, often referred to as radio waves or radio signals, propagate well through the air, but in general do not propagate well through man-made structures, such as large buildings, or into the body of the earth.

However, it has been known in the past that radio signals having a lower frequency, generally below 300 KHz, propagate better through a medium such as the body of the earth or large man-made structures, than radio signals having higher frequencies. In fact, low frequency radio signals have been known to propagate several thousand feet, or two to three kilometers, into the earth. In addition, low frequency radio signals have been used to carry information to remote locations either under the ground or in large man-made structures. However, in order to generate low frequency radio signals that can propagate through the earth, it is generally necessary to have a fairly large antenna, such as an antenna approximately 10 meters to 150 meters in diameter, as well as a signal generator that can generate a signal at a sufficient power output to reach the surface. While it is possible to have an antenna of this size located on the surface of the earth, it is generally difficult to have antennas of this size and power output located underneath the earth or within man-made structures. Also, it would not be possible for such an antenna to be made portable so that it can be carried by an individual. This results in it being possible to transmit low frequency radio signals into underground environments or into large man-made structures, but it is difficult to then transmit low frequency radio signals out of underground environments or man-made structures simply because it is not practical to have antennas and signal generators with such large diameters and power outputs in these environments, or, to have them mobile.

Accordingly, in the past, several types of communication systems utilizing low frequency radio signals have been proposed. However, all of these prior art systems provide for communication into the medium, but do not provide for easy communication of radio signals out of the medium. In particular, low frequency communication signals for communication to underground environments, such as in mines, have been proposed in the past. However, these low frequency communication systems generally are used to propagate alert signals or warnings into the underground environment, but do not provide easy transmission of information out of the underground environment.

Accordingly, there is a need in the art for a communication system for communicating radio signals to, as well as from, remote transceivers located within a medium through which radio signals generally do not propagate well. In particular, there is a need in the art for a radio frequency communication system for communicating radio signals to and from remotely located transceivers utilizing a low frequency radio signal, but not requiring large antennas or powerful signal generators located within the medium.

SUMMARY OF THE INVENTION

Accordingly, it is an object of this invention to at least partially overcome the disadvantages of the prior art. Also, it is an object of this invention to provide an improved type of communication system which can use low frequency radio signals to transmit information to and from remote transceivers located within the medium.

Accordingly, in one of its objects, this invention resides in a radio frequency communication system for communicating radio signals, said communication system comprising:
  a central station comprising a transmitter for transmitting a synchronization signal at a low radio frequency into a medium, and, a receiver for receiving radio signals from the medium;
  a remote transceiver located within the medium for receiving the low frequency synchronization signal and transmitting an information radio signal to be received by the central station; and
  wherein the information radio signal is synchronized in time with the low frequency synchronization signal.

In a further aspect, the present invention resides in a radio frequency communication system for communicating information from and to remote transceivers located within a medium by way of radio signals, said communication system comprising:
  a central station comprising a transmitter for transmitting a low frequency radio signal into the medium, and, a receiver for receiving information signals from the medium;
  a zone transceiver located within a zone of the medium for receiving the low frequency radio signal and transmitting a zone information radio signal in response to and synchronized in time with the low frequency radio signal; and
  wherein the zone information radio signal is indicative of information received by the zone transceiver from remote transceivers located within the zone.

In a still further aspect, the present invention resides in a method of communicating information to and from remote transceivers located within a medium by way of radio signals, said method comprising the steps of:
  transmitting a low frequency radio signal into the medium from a central station;
  receiving the low frequency radio signal at a zone transceiver located within a zone of the medium;
  transmitting a zone information radio signal from the zone transceiver to the central station in response to, and synchronized in time with, the low frequency radio signal; and
  wherein the zone information signal is indicative of information received by the zone transceiver from transceivers located within the zone.

One advantage of the present invention is that by having the signals emanating from transceivers within the medium synchronized with the low frequency radio signal being transmitted into the medium, the specific time at which the information signals from within the medium should be received by the central station can be determined. In other words, the receiver at the central station can be designed to receive the signal at specific time periods, thereby improving the reception of the information radio signals emanating from transceivers within the medium. This permits the central station to receive radio signals having a much lower power output and also at a higher frequency. Radio signals of this type can be easily generated by mobile transceivers having relatively small antennas.

A further advantage of the present invention is that the synchronization of the information radio signals emanating from transceivers within the medium can be used to assist in filtering noise from the information radio signals. In other words, because it is known that the information signals from transceivers in the medium should be received at precise time periods, more advanced filters, such as filters which perform Laplace transformations, Fourier transformations, or a combination of both, can be utilized to minimize the noise to signal ratio of the information signals being transmitted from transceivers within the medium.

A further advantage of the present invention is that, because the system improves the reception of signals being transmitted from transceivers within the medium, the transceivers can be used to transmit information of a more sensitive nature, such as information regarding the control and monitoring of equipment within the medium.

A further advantage of the present invention is that zone transceivers can be used within the medium to amplify and retransmit signals received from transceivers within the zone of the zone transceivers. In this way, zone transceivers can extend the electromagnetic signal coverage of the low frequency transmitter and receiver located outside of the medium. The zone information signals transmitted by the zone transceivers will be synchronized in time with the low frequency radio signal, and therefore will also be received more easily by the receiver at the central station. In addition, where more than one zone transceiver is used, each zone transceiver can be synchronized with the low frequency radio signal.

A still further advantage of the present invention is that the low frequency synchronization radio signal can be modulated. In this way, information can be transmitted from the central station to the transceivers. Also, the central station can modulate the synchronization signal to poll or address a specific transceiver or send information, such as instructions, to a specific transceiver. In one embodiment, a part of the modulated synchronization signal can be reserved for receiving information radio signals from any one of the transceivers indicating an emergency or alert within the mine.

A further advantage of the present invention is that all radio signal communication within the medium can be synchronized by the low frequency radio signal. In this way, communication between transceivers within the medium can be improved, even though the communication signals are not transmitted outside of the medium, simply because the information signals being transmitted between the various transceivers within the medium is synchronized, and therefore improved filtering and reception are possible.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention:

FIG. 4 is a timing drawing showing the low frequency synchronized signal synchronizing communication into and out of a medium; and FIG. 5 is a schematic diagram of a zone transceiver according to one embodiment of the present invention.

DETAILED DESCRIPTION OF THE PREFERRED EMBODIMENTS

Figure 1:
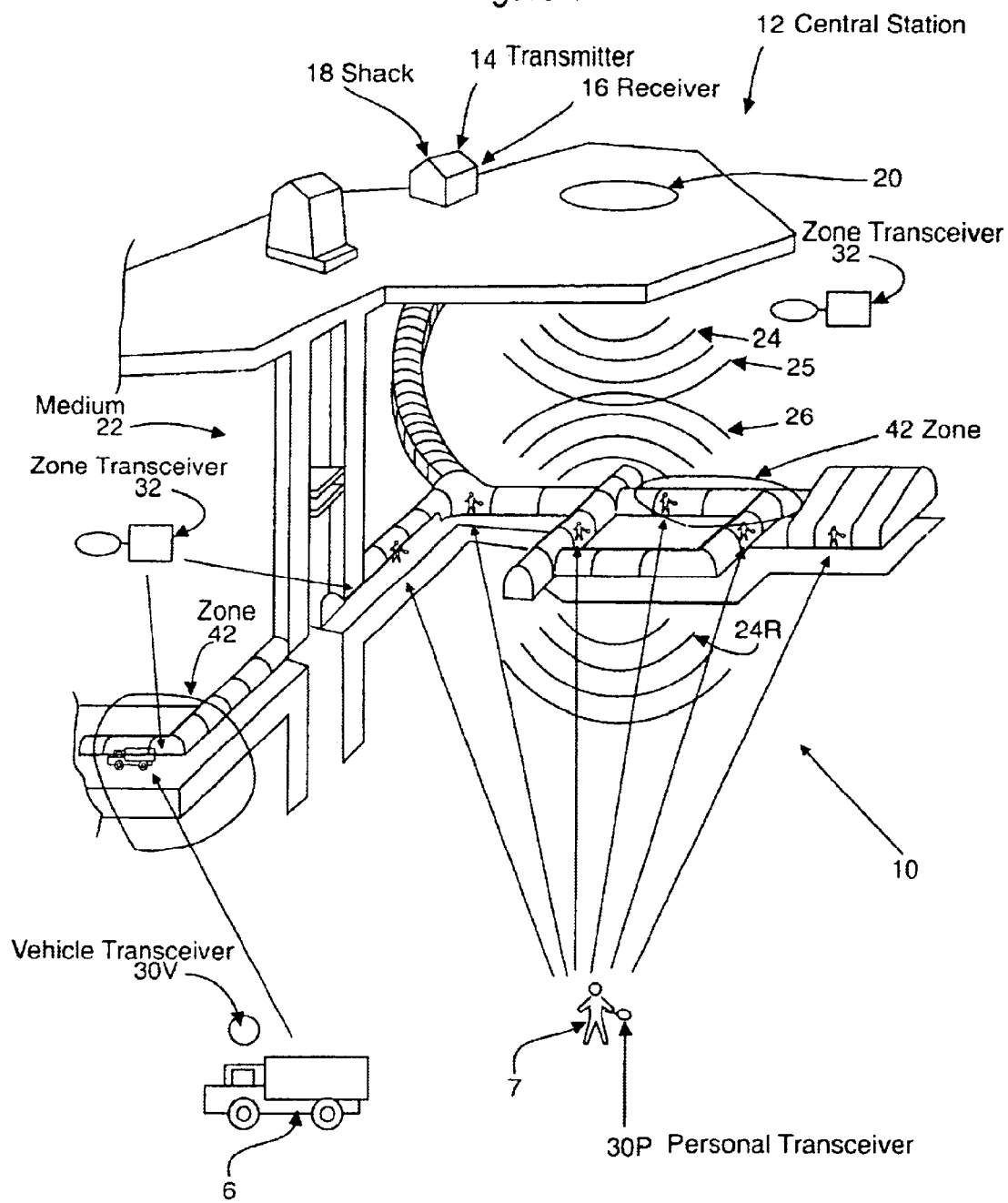
FIG. 1 is a schematic side elevation showing a mine site with the synchronized communication system according to one embodiment of the present invention installed therein.

As shown in FIG. 1, the present invention comprises a communication system, shown generally by reference numeral 10, for communicating radio signals into a medium 22. The communication system 10 illustrated in FIG. 1 is installed in a mine 8 and therefore the medium 22 comprises the body of the earth.

The communication system 10 comprises a central station, shown generally by reference numeral 12. The central station 12 is generally located outside of the medium 22. The central station 12 in the embodiment shown in FIG. 1 comprises a transmitter/receiver shack 18 electrically coupled to an antenna 20.

The antenna 20 is generally a large surface loop antenna which can generate low frequency waves. For example, the surface loop antenna can be between about 10 meters to 150 meters in diameter.

The transmitter/receiver shack 18 houses a transmitter 14 and a receiver 16. The transmitter 14 transmits a synchronized signal, shown generally by reference numeral 24, through the antenna 20 at a low frequency into the medium 22. The receiver 16 receives radio signals from the medium 22 through the antenna 20. Accordingly, the antenna 20 can be used to both transmit the synchronized signal at a low frequency and receive radio signals from the medium 22.

The communication system 10 further comprises at least one, and preferably a plurality, of remote transceivers 30. The remote transceivers 30 are located within the medium 22 and can receive the low frequency synchronization signal 24. The remote transceivers can also transmit an information radio signal, shown generally by reference numeral 26, to be received by the antenna 20 of the central station 12.

Figure 2:
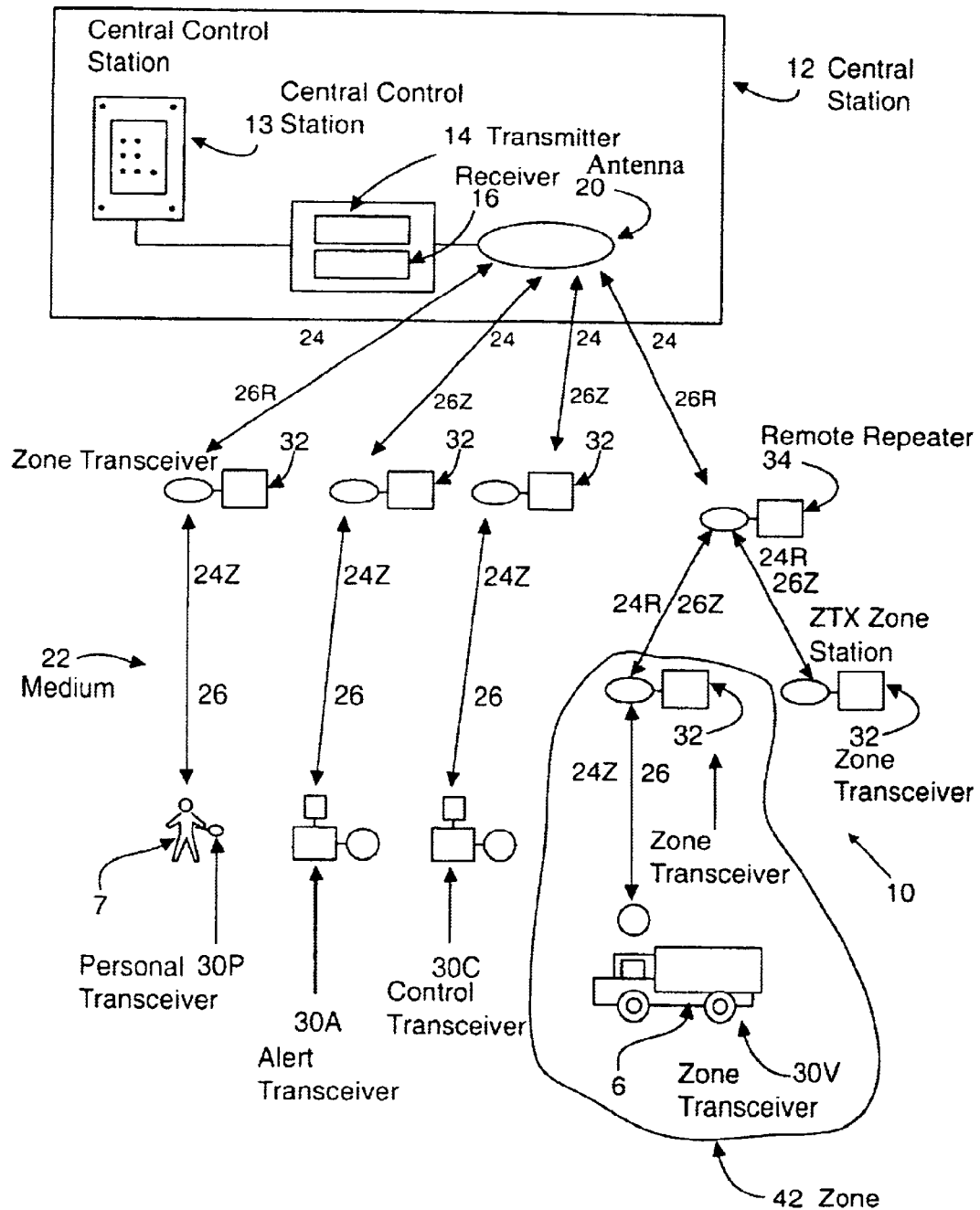
FIG. 2 is a schematic drawing of a further embodiment of the synchronized communication system according to one embodiment of the present invention.

As shown at least in FIGS. 1 and 2, the transceivers 30 can be several types of transceivers 30. For instance, the transceivers 30 can be personal transceivers 30P, which can be located on personnel. The personal transceivers 30P preferably are connected to the capped lamps of the personnel and can derive power from the battery attached to the capped lamp. The personal transceivers 30P send information radio signals 26 comprising information regarding the person 7 associated with the personal transceiver 30P. Such information may include the location of the person 7 in the mine 8 and how long the person 7 has been stationary.

The transceivers 30 also comprise vehicle transceivers 30V which are attached to vehicles 6. The vehicle transceivers 30V generally derive power from the battery or alternator of the vehicle 6. Vehicle transceivers 30V send information radio signals 26 comprising information regarding the vehicle 6 associated with the vehicle transceiver 30V. Such information may include the location of the vehicle 6 within the mine 8, the type of vehicle 6 and the mechanical condition of the vehicle 6 such as its fuel state and engine temperature.

Several other types of remote transceivers are also possible, such as the remote alert transceivers 30A shown schematically in FIG. 2 which can be located at different locations in the mine 8 to visually and audibly alert persons 7 in the mine 8 of an emergency. FIG. 2 also schematically shows a control transceiver 30C which can control equipment, such as drills (not shown), in the mine 8. The control transceiver 30C sends information radio signals 26 indicative of the status of the equipment to which the control transceiver 30C is connected, and, also receives control information from the central station 12 to control operation of the equipment to which the control transceiver 30C is connected.

The low frequency synchronization signal 24 propagates through a portion of the medium 22 thereby creating a synchronous field, shown generally by reference numeral 25, within at least a portion of the medium 22. All transceivers 30 located within the synchronous field 25 are able to receive the synchronized signal 24 and can send the information radio signals 26 to the central station 12 synchronized in time with the low frequency synchronization signal 24. In this way, the central station 12 can more easily receive the information radio signals 26 from the transceivers 30 at least, in part, because the receiver 16 of the central station 12 polls for or expects to receive the information radio signals 26 at discreet predetermined time periods corresponding to the period of the low frequency synchronization signal 24. Also, the central station 12 utilizes the synchronization of the information radio signal to know during which predetermined time periods the information radio signals should be received and thereby can apply more advanced filtering to remove noise from the information radio signal.

It is found that low frequency radio waves in the range of 2 KHz to 200 KHz propagate best through the body of the earth. Therefore, when the system 10 is used in a mine 8, as illustrated in FIG. 1, the synchronization signal 24 is preferably transmitted as a low frequency radio wave having a frequency between 2 KHz to 200 KHz and, more preferably, between 3 KHz to 10 KHz.

The information radio signals 26 transmitted by the transceivers 30 preferably are also in the low frequency radio range. However, it is not practical to have antennas large enough to generate information radio signals 26 from the transceivers 30 below 100 KHz. Accordingly, it is preferable that the information radio signals are transmitted at a frequency in the range of 100 KHz to 200 KHz and, more preferably, in the range of 150 KHz to 200 KHz.

As also shown in FIG. 1, the communication system 10 can comprise zone transceivers 32. Each zone transceiver 32 is located within a specific zone 42 in the mine. These zone transceivers 32 receive the synchronized signal 24 and retransmit an amplified synchronization signal 24Z, as best seen in FIG. 2, at the same low frequency for reception by transceivers 30 in the zone 42. In this way, zone transceivers 32 can increase the propagation of the synchronized signal 24 and, therefore, the synchronous field 25, within the medium 22, by receiving and retransmitting an amplified synchronized signal 24Z within the zone 42. Likewise, the zone transceivers 32 receive the information radio signals 26 from the transceivers within the zone 42. The zone transceivers 32 then retransmit an amplified zone information radio signal 26Z to be received by the antenna 20 of the central station 12. The zone information radio signals 26Z is synchronized in time with the low frequency synchronization signal 24 and carries information contained in the information radio signal 26 of transceivers located within the zone 42 of the zone transceivers 32.

In a similar manner, the communication system 10 can comprise remote repeater stations 34. The remote repeater stations 34 are located within the medium 22 and preferably near a boundary of the portion of the medium 22 through which the synchronized signal 24 can propagate. The remote repeater stations 34 receive the synchronization signal 24 and retransmit an amplified synchronization signal 24R at the same low radio frequency for reception by transceivers 30 and zone transceivers 32 located proximate the remote repeater stations 34 but external to the portion of the medium 22 through which the synchronized signal 24 from the antenna 20 can normally propagate. The remote repeater stations 34 also receive information radio signals 26 and zone information radio signals 26Z and re-transmits amplified information radio signals 26R corresponding to these signals 26, 26Z for reception by the central station 12. In this way, the remote repeater stations 34 can effectively extend the synchronous field 25 within the medium 22.

As shown in FIG. 2, the amplified synchronized signal 24R from the remote repeater stations 34 can be received and retransmitted by a zone transmitter 32 located proximate the remote repeater stations 34. The retransmitted synchronized signal 24Z from the zone transmitter 32 can then be received by a transceiver 30, such as a vehicle transceiver 30V, shown in FIG. 2, within the zone 42 of the zone transceiver 32. The vehicle transceiver 30V then sends information signals 26 which are received by the zone transceiver 32 and retransmitted as amplified zone information radio signals 26Z. The retransmitted zone information radio signals 26Z are received by the remote repeater stations 34 and retransmitted again as amplified information radio signals 26R which are in turn received by antenna 20 of the central station 12.

Figure 3:
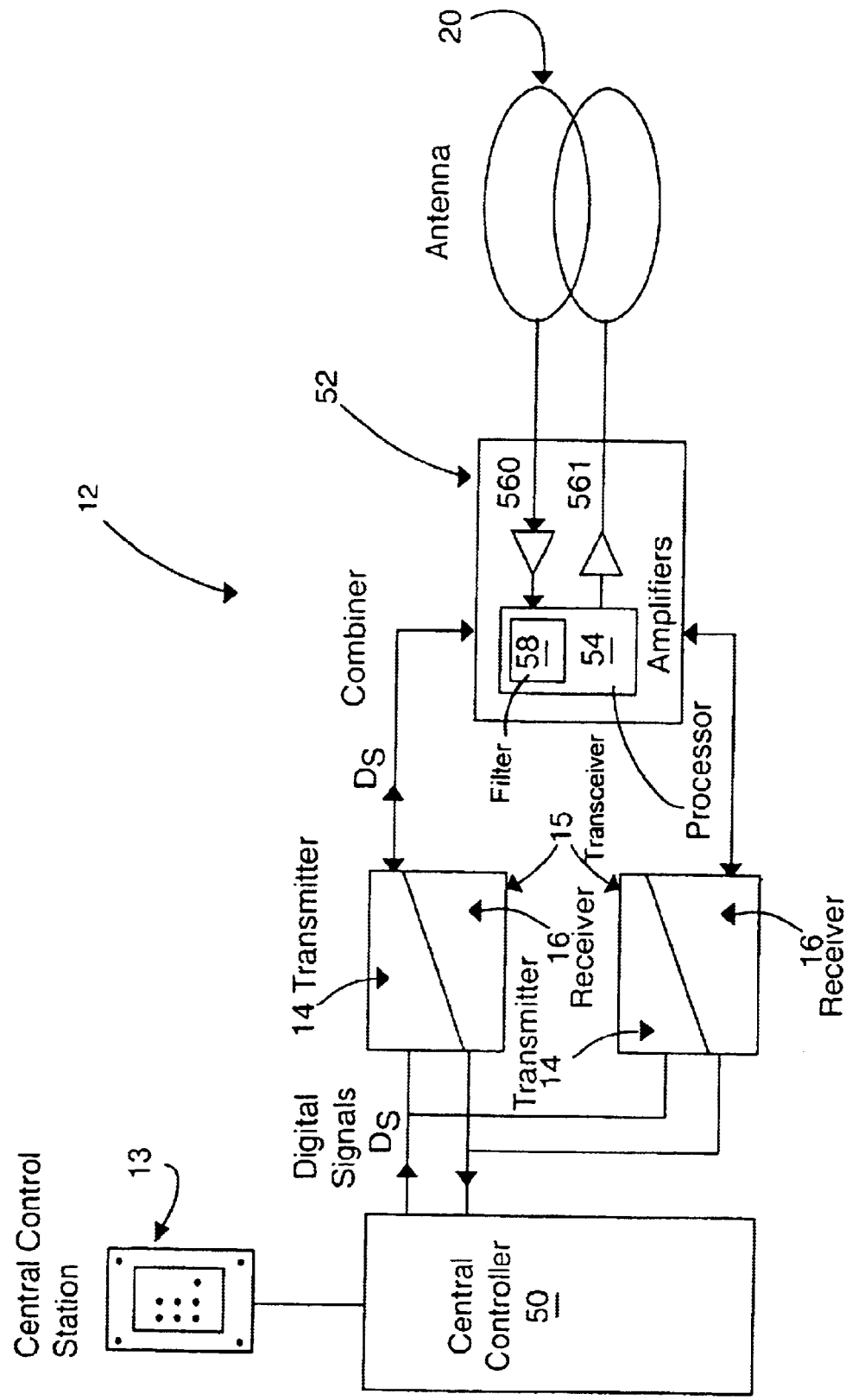
FIG. 3 is a schematic drawing of the central station of the communication system according to a further embodiment of the present invention.

As shown in FIG. 2, the central station 12 can comprise a separate transmitter 14 and receiver 16 which receive signals from the central control station 13 and transmit the signals through the antenna 20 into the medium 22. In another embodiment of the present invention, as shown in FIG. 3, the central station 12 can comprise transceivers 15 which both receive and transmit the signals 24, 26 into and out of the medium 22. Accordingly, the present invention can operate whether the central station 12 comprises a single transceiver 15, more than one transceiver 15, or separate transmitters 14 and receivers 16.

As also shown in FIG. 3, the central station 12 comprises a central controller 50 which receives instructions from the central control station 13, or other locations, either proximate or remote to central station 12, and converts these instructions into digital signals DS. These digital signals DS are then sent to a transmitter 14, which in the embodiment shown in FIG. 3, forms part of the base transceiver 15. The digital signals DS are then sent from the transceiver 15 to the combiner 52. The combiner 52 comprises a processor 54 and amplifiers 56O and 56I. Amplifier 56O amplifies the information signals coming out of the medium 22 and the amplifier 56I amplifies the signals being transmitted into the medium 22. The amplifiers 56O and 56I are connected to the antenna 20 to generate the radio wave signals which propagate into the medium 22.

Preferably, the central station 12 comprises a filter 58 which filters the information radio signals 26 received by the antenna 20 from the transceivers 30. The filter 58 can be any known type of filter to filter noise from the information radio signals 26. However, as the information radio signals 26 are synchronized to the synchronized signal 24, it is possible to perform advanced filtering utilizing Laplace transformations and Fourier transformations. Therefore, the filter 58 can utilize Laplace and/or Fourier transformations to filter noise from the signals 26 because the radio information radio signals 26 are synchronized with the synchronization signal 24, and therefore the central station 12 knows when the signals 26 will be transmitted and therefore when they should be received by the antenna 20.

FIG. 4 is a timing diagram illustrating how the information radio signals 26 are synchronized with the synchronization signal 24. As shown in FIG. 4, the synchronization signal 24 corresponds to a sync pulse 80 which is created by demodulating the synchronization signal 24.

The zone transceiver 32 in the embodiment illustrated in FIG. 4 is operating at 160 KHz and the information carried by the zone information signal 26Z is represented by the zone transceiver response 82. The dark squares illustrated in the zone transceiver response 82 of FIG. 4 actually correspond to a number of pulses which the zone transceiver 32 is transmitting. The number of pulses will be a function of the frequency of the synchronization signal 24 and the frequency at which the zone transceiver transmits the information radio signals 26. In this embodiment, where the zone transceivers 32 transmit the information radio signals 26 at about 160 KHz, there will be about 18 pulses or cycles within each sync pulse 80.

The presence of the 160 KHz beacon, which correspond to the dark squares, during the sync pulse indicates a high or binary "1" (indicated by the presence of a square box) signal and the absence of a 160 KHz beacon (indicated by the absence of a square box) indicates a low or binary "0" value. FIG. 4 illustrates that the zone information signal 26Z, as represented by the zone transceiver response 82, is synchronized with the sync pulse 80 generated by the synchronization signal 24 because each of the square boxes correspond in time with the sync pulse 80.

As illustrated in FIG. 4, the zone transceiver response will commence with a leader portion and then have a status information portion. After the status information portion, the zone transceiver 32 will then transmit additional information digitally by the presence or absence of the 160 KHz beacon at each upward step of the sync pulse 80. In this way, the information radio signals 26 embody digital information by the presence or absence of the 160 KHz beacon at each upward step or high value of the sync pulse 80.

In another preferred embodiment, the synchronizing signal 24 can be modulated in order to transmit information down into the medium 22. Because of the low frequency of the synchronization signal 24, any information transmitted into the medium 22 will, of course, have a small band width. Nevertheless, information can be reliably transmitted into the medium 22.

FIG. 4 illustrates one preferred embodiment where the synchronization signal 24 is modulated using Frequency Shift Keying (FSK) to transmit information into the medium 22. The synchronization signal 24 is varied from a first low frequency to a second low frequency where the second low frequency is different from the first low frequency. For example, in a preferred embodiment, as illustrated in FIG. 4, the sychronization signal 24 is varied from a first low frequency 8192 Hz to a second frequency of 9000 Hz. The rate at which the synchronization signal 24 is varied indicates the information or instructions being sent.

For example, in a preferred embodiment as illustrated in FIG. 4, the synchronizations signal 24 can be modulated between 1 Hz to 49 Hz. This means that the frequency of the synchronization signal 24 can be varied from 8192 Hz to 9000 Hz between 1 and 49 times a second. The zone transceivers 32 and the transceivers 30 will be able to detect the rate at which the synchronization signal 24 changes between these two frequencies and in this way information, including instructions, can be transmitted from the central station 12 to the transceivers 30 and zone transceivers 32.

Preferably, the modulation frequency of the synchronization signal 24, which are indicative of the information and instructions being sent to the mine 8, will be selected to avoid harmonics. For example, the modulation frequencies can be strategically selected with 1 Hz to 2.25 Hz steps to avoid harmonics between each other.

Preferably, the zone transceiver response 82 will be sent in response to an instruction from the central station 12 addressing a particular zone transceiver 32. For example, the central station 12 will modulate the synchronization signal 24 until to poll or address a particular zone transceiver 32. The addressed zone transceiver 32 would then send its zone information radio signal 26Z which would be in the form of the zone transceiver response 82.

If a zone transceiver 32 sends its transceiver response 82 after being polled or addressed by the central station 12, the central station 12 would know the addressed zone transceiver 32 is sending the its zone information radio signal 26Z and thereby could identify the source of the information. In the alternative, if a zone transceiver 32 is independently sending a signal to the central station 12, it can uniquely identify itself using a unique information radio signal 26 comprising a binary code sent as described above.

FIG. 5 shows a schematic diagram of a zone transceiver 32 according to one embodiment of the present invention. As shown in FIG. 5, the zone transceiver 32 will comprise an antenna 64 receiving radio information signals 26 from transceivers 30 as well as the synchronization signal 24 either from the central station 12 or a repeater station 34. The antenna 60 is connected through an amplifier 62 to a transceiver 64. Preferably, the transceiver 64 comprises a demodulator 66 which demodulates the modulated synchronization signal 24. The information demodulated from the modulated synchronization signal 24 is sent to a processor 68. The processor 68 will then decode the information received through the modulated synchronization signal 24. The processor 68 is connected to memory 70 which has stored therein the codes to decode the modulated synchronization signal 24. The memory 70 also has stored therein subroutines for the processor 68 to execute in response to the instructions from the central station 12. In this way, FSK modulation of the synchronizing signal 24 can transmit information, and in particular instructions, to each of the zone transceivers 24.

While FIG. 4 is illustrated with respect to a response from a zone transceiver 32, it is understood that the central station 12 can poll or address a transceiver 30 in the same manner, provided the transceiver 30 has the necessary electronics, as illustrated in FIG. 5 with respect to the zone transceiver 32, to demodulate the FSK modulated synchronization signal 24. Accordingly, the central station 12 can send information, including instructions, to the transceivers 30 in a similar manner to that described above with respect to the zone transceivers 32.

In a further preferred embodiment, the zone transceivers 32 will continually receive information radio signals 26 from transceivers 30 located within their zone 42 and will store the information carried in the information radio signals 26 in the memory 70. Such information could include the presence, as well as entry and exit, of personal transceivers 30P or vehicle transceivers 30V within the zone 42. The information stored in memory 70 will then be downloaded once the zone transceiver 32 is polled or addressed by the central station 12 in the manner as discussed above. In this way, information regarding the zone 42 can be more quickly transmitted from the zone transceiver 32 to the central station 12 rather than by having the central station 12 individually address or poll each of the transceivers 30 within the zone 42 by sending the modulated synchronization signal 24 through the zone transceiver 32 to each transceiver 30 in the zone 42.

The timing drawing illustrated in FIG. 4 shows the synchronization signal 24 at the moment at which it changes from the first low frequency, namely 8192 Hz in this embodiment, to the second low frequency, namely 9000 Hz in this embodiment. In a further preferred embodiment of the present invention, one of the frequencies, namely, the first frequency or the second frequency, is selected as a priority listen frequency to receive alert signals and the other frequency is used for receiving general information radio signals 26.

For example, as illustrated in FIG. 4, when the synchronization signal 24 is at the first frequency, namely 8192 Hz, the central station 12 receives the information radio signals 26 in the form of the zone transceiver response 82 from the addressed zone transceiver 32. Once the modulated synchronization signal 24 shifts to the second frequency, namely 9000 Hz, the zone transceiver response 82 from the addressed zone transceiver 32 stops and the central station listens for any priority signals, such as alert signals or other signals indicating an emergency in the mine 8. For example, as illustrated in FIG. 4, the leader and priority codes from a particular zone transceiver 32 or transceiver 30 are being received during the priority listen when the synchronization signal 24 is at the second frequency, namely 9000 Hz. This will indicate to the central station 12 that an emergency exists within the mine 8 and the central station 12 will then send a general alert signal to all the zone transceivers 32 and transceiver 30 by FSK modulating the synchronizing signal. It is generally not necessary for the central station 12 to know which zone transceiver 32 or transceiver 30 is sending the alert signal and, therefore, it is not necessary that the leader and priority codes identify the zone transceiver 32 or transceiver 30. However, the system 10 can be configured such that the zone transceiver 32 and transceiver 30 uniquely identify themselves by sending their unique code when the transmit an information radio signal 26, 26Z indicating an emergency in the mine 8.

It is understood that, while the present invention has been described in terms of a communication system for use in a mine 8, where the medium 22 is a portion of the earth, the present invention is not limited to communication systems for communicating signals in the mine 8 or to a medium 22 which is a portion of the earth. Rather, the present invention can be used to communicate signals to a number of different mediums 22, such as buildings, subways, tunnels or other natural or man-made structures. It is understood that while low frequency radio signals will propagate best through these large natural and man-made structures, the specific frequency used can be selected so that the low frequency synchronization signal 24 propagates best through the corresponding medium 22 can be easily determined by experimentation.

It is understood that, while the invention has been described in terms of transceivers 15 and 30 and transmitter 14 and receiver 16, the invention is not limited to any particular combination of transmitter, receiver or transceiver. Rather, it is understood that reference to a transmitter includes the transmitter portion of the transceiver and reference to a receiver includes the receiver portion of a transceiver. Also, reference to a transceiver may include a separate receiver and transmitter operating in combination. Accordingly, the present invention includes all combinations of receivers, transmitters and transceivers which together function to receive and send the radio signals as described and illustrated herein and is not limited to a particular transmitter, receiver or transceiver arrangement.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, mechanical or electrical equivalents of the specific embodiments and features that have been described and illustrated herein.

What is claimed is:

1. A radio frequency communication system for communicating radio signals, said communication system comprising:

a central station located above ground comprising a transmitter for transmitting a synchronization signal at a frequency in the range of 2 KHz to 200 KHz into a medium comprising a portion of the earth, and, a receiver for receiving radio signals from the medium;

a remote transceiver located below ground within the medium for receiving the synchronization signal and transmitting an information radio signal at a frequency in the range of 100 KHz to 200 KHz to be received by the central station;

a filter circuit for filtering noise from the information radio signal, said filter circuit comprising a transformation circuit to perform a transformation selected from a group comprising Laplace transformations and Fourier transformations;

wherein the filter circuit utilizes the synchronization of the information radio signal to perform one or more transformations in the group of transformations; and wherein the information radio signal is synchronized in time with the synchronization signal.

2. A radio frequency communication system as defined in claim 1 further comprising a plurality of remote transceivers, each remote transceiver for receiving said synchronization signal and for transmitting a corresponding information radio signal synchronized in time with said synchronization signal;

wherein said synchronization signal can be modulated to address one of the plurality of remote transceivers; and wherein, in response to the modulated synchronization signal, the addressed one of the plurality of remote transceivers transmits its corresponding information signal acknowledging receipt of the modulated synchronization signal.

3. A radio frequency communication system as defined in claim 2 wherein at least one of the plurality of remote transceivers is associated with equipment, a vehicle or an individual; and wherein the corresponding information signal transmitted by the addressed one of the plurality of remote transceivers in response to the modulated synchronization signal comprises information regarding the equipment, vehicle or individual associated with the remote transceiver.

4. A radio frequency communication system as defined in claim 3 wherein the synchronization signal can be modulated to comprise information; and wherein at least one of the plurality of remote transceivers comprises a de-modulation circuit for demodulating the synchronization signal.

5. A radio frequency communication system as defined in claim 1 wherein the medium is not receptive to transmission of radio waves.

6. A radio frequency communication system as defined in claim 1 further comprising:

a zone transceiver located within a zone of the medium for receiving the synchronization signal and retransmitting an amplified synchronization signal at the frequency in the range of 2 KHz to 200 KHz for reception by transceivers in the zone;

wherein the zone transceiver receives the information radio signal from remote transceivers located within the zone and retransmits an amplified zone information radio signal to be received by the central station; and wherein the amplified zone information radio signal is synchronized in time with said synchronization signal and carries information contained in the information radio signal.

7. A radio frequency communication system for communicating information from and to remote transceivers located within a medium, said medium comprising a portion of the earth, by way of radio signals, said communication system comprising:

a central station located above ground comprising a transmitter for transmitting a low frequency radio signal at a frequency in the range of 2 KHz to 200 KHz into the medium, a receiver for receiving information signals from the medium and a filter circuit comprising a transformation circuit to perform a transformation selected from a group of transformations comprising Laplace transformations and Fourier transformations;

a zone transceiver located below ground and within a zone of the medium for receiving the low frequency radio signal and transmitting a zone information radio signal at a frequency in the range of 100 KHz to 200 KHz in response to and synchronized in time with the low frequency radio signal;

wherein the zone information radio signal is indicative of information received by the zone transceiver from remote transceivers located within the zone; and wherein the filter circuit utilizes the synchronization of the zone information radio signal to perform one or more transformations in the group of transformations to filter noise from the information radio signal.

8. A radio frequency communication system as defined in claim 7 wherein the zone transceiver comprises a storage device for storing the information received from the remote transceivers located within the zone; and wherein the zone information radio signal is indicative of the information which had been received by the zone transceiver from remote transceivers located within the zone and which was stored in the storage device.

9. A radio frequency communication system as defined in claim 7 further comprising a plurality of zone transceivers, each zone transceiver located within a corresponding zone;

wherein each zone transceiver receives the low frequency radio signal and transmits a corresponding zone information radio signal synchronized in time with the low frequency radio signal;

wherein, in response to the low frequency radio signal, each one of the plurality of zone transceivers transmits its corresponding zone information radio signal synchronized in time with the low frequency radio signal.

10. A radio frequency communication system as defined in claim 7 wherein the low frequency radio signal can be modulated to address at least one of the remote transceivers located within the medium;

wherein the zone transceiver receives the modulated low frequency radio signal and retransmits an amplified low frequency radio signal for reception by transceivers in the zone; and wherein, if an addressed transceiver is located within the zone, the zone transceiver receives an information radio signal transmitted from the addressed transceiver and retransmits an amplified information radio signal synchronized in time with the low frequency radio signal to be received by the central station.

11. A method of communicating information to and from remote transceivers located within a medium, said medium comprising a portion of the earth, by way of radio signals, said method comprising the steps of:

transmitting a low frequency radio signal at the frequency in the range of 2 KHz to 200 KHz into the medium from a central station located above ground;

receiving the low frequency radio signal at a zone transceiver located within a zone of the medium;

transmitting a zone information radio signal at a frequency in the range of 100 KHz to 200 KHz from the zone transceiver to the central station in response to, and synchronized in time with, the low frequency radio signal;

filtering the noise from the zone information radio signal with a filter circuit by utilizing the synchronization of the zone information radio signal to perform one or more transformations selected from a group of transformations comprising Laplace transformations and Fourier transformations; and wherein the zone information radio signal is indicative of information received by the zone transceiver from transceivers located within the zone.

12. A method of communicating information as defined in claim 11 further comprising the steps of:

transmitting information signals from the remote transceivers in the zone to the zone transmitter, said information signals containing information from the remote transceivers; and storing the information contained in the information signals in a storage device located at the zone transceiver until the zone transceiver receives the low frequency radio signal.

13. A radio frequency communication system for communicating radio signals from and to remotely located transceivers and remotely located zone transceivers located below ground and within a medium, said medium comprising a portion of the earth, by way of radio signals, said communication system comprising:

a central station located above ground comprising a transmitter for transmitting a low frequency radio signal having a frequency in the range of 2 KHz to 200 KHz into the medium, and, a receiver for receiving information signals having a frequency in the range of 100 KHz to 200 KHz from the medium;

wherein the low frequency radio signal propagates the signal through a portion of the medium and creates a synchronous field within the portion of the medium; and wherein the transceivers and zone transceivers in the synchronous field transmit information radio signals and zone information radio signals, respectively, synchronized with the synchronous field to the central station.

14. A radio frequency communication system as defined in claim 13 further comprising a repeater station located within the medium;

wherein the repeater station is located within the synchronous field and near a boundary of the portion of the medium;

wherein the repeater station receives the low frequency radio signal and retransmits an amplified synchronization signal at a frequency in the range of 2 KHz to 200 KHz for reception by the transceivers and zone transceivers located within the medium and proximate the repeater station in the portion of the medium;

wherein the repeater station receives information radio signals and zone information radio signals from transceivers and zone transceivers located within the medium and external to the portion of the medium and retransmits amplified information radio signals and amplified zone information radio signals corresponding to the received information radio signals and received zone information radio signals; and wherein the amplified information radio signals and zone information radio signals can be received by the central station to thereby extend the synchronous field.

15. A radio frequency communication system as defined in claim 10 wherein the low frequency radio signal can be modulated by Frequency Shift Keying (FSK) from a first low frequency to a second low frequency different from the first low frequency.

16. A radio frequency communication system as defined in claim 15 wherein when the low frequency radio signal is at the second low frequency an alert information radio signal indicating an alert can be received by the central station from any of the plurality of transceivers; and the alert information radio signal indicating an alert is synchronized with the second low frequency of the low frequency radio signal.

17. A radio frequency communication system as defined in claim 8 further comprising a plurality of zone transceivers, each zone transceiver located within a corresponding zone;

wherein each zone transceiver receives the low frequency radio signal and transmits a corresponding zone information radio signal synchronized in time with the low frequency radio signal;

wherein, in response to the low frequency radio signal, each one of the plurality of zone transceivers transmits its corresponding zone information radio signal synchronized in time with the low frequency radio signal.

18. A radio frequency communication system as defined in claim 8 wherein the low frequency radio signal can be modulated to address at least one of the remote transceivers located within the medium;

wherein the zone transceiver receives the modulated low frequency radio signal and retransmits an amplified low frequency radio signal for reception by transceivers in the zone; and wherein, if an addressed transceiver is located within the zone, the zone transceiver receives an information radio signal transmitted from the addressed transceiver and retransmits an amplified information radio signal synchronized in time with the low frequency radio signal to be received by the central station.

* * * * *